(12) United States Patent
Ridel et al.

(10) Patent No.: US 9,894,539 B2
(45) Date of Patent: Feb. 13, 2018

(54) DIGITAL FULL DUPLEX OVER SINGLE CHANNEL SOLUTION FOR SMALL CELL BACKHAUL APPLICATIONS

(71) Applicant: Maxlinear Asia Singapore Private Limited, Singapore (SG)

(72) Inventors: Eran Ridel, Rosh Ha'aiyn (IL); Ran Soffer, Tel-Mond (IL); Uri Kanari, Herzeliya (IL); Evgeny Levitan, Haifa (IL); Idan Zalitzky, Raanana (IL); Yaniv Bar, Rehovot (IL)

(73) Assignee: Maxlinear Asia Singapore PTE LTD, Singapore (SG)

( * ) Notice: Subject to any disclaimer, the term of this patent is extended or adjusted under 35 U.S.C. 154(b) by 122 days.

(21) Appl. No.: 15/091,324

(22) Filed: Apr. 5, 2016

(65) Prior Publication Data
US 2016/0294533 A1 Oct. 6, 2016

Related U.S. Application Data

(60) Provisional application No. 62/143,717, filed on Apr. 6, 2015.

(51) Int. Cl.
*H04W 16/32* (2009.01)
*H04L 1/00* (2006.01)
(Continued)

(52) U.S. Cl.
CPC ............ *H04W 16/32* (2013.01); *H04B 1/525* (2013.01); *H04L 1/00* (2013.01); *H04L 5/14* (2013.01);
(Continued)

(58) Field of Classification Search
CPC ... H04W 16/32; H04W 16/10; H04W 84/045; H04W 92/20; H04B 1/525; H04L 1/00; H04L 5/14; Y02B 60/50
See application file for complete search history.

(56) References Cited

U.S. PATENT DOCUMENTS

2013/0102254 A1* 4/2013 Cyzs ...................... H04B 1/126
455/63.1
2015/0049720 A1* 2/2015 Negus ................. H04W 72/082
370/329
(Continued)

*Primary Examiner* — Duc C Ho
(74) *Attorney, Agent, or Firm* — McAndrews, Held & Malloy, Ltd.

(57) ABSTRACT

To provide for higher data rates, a wireless back haul network for connecting small cell base stations to a core network can be implemented using full-duplex over single channel communications. The difficulty with full-duplex over single channel communications, and the reason why it has not become common place in wireless and mobile communication standards to date, is the significant interference that the receiver of a full-duplex communication device will generally experience from the full-duplex communication device's own transmitter transmitting over the same channel that the receiver is to receive signals. This interference is referred to as self-interference because the interference experienced by the receiver originates from its own paired transmitter. The present disclosure describes embodiments of an apparatus and method that provide sufficient self-interference cancellation in a compact and power efficient manner for a small cell wireless backhaul network.

20 Claims, 5 Drawing Sheets

(51) Int. Cl.
*H04W 16/10* (2009.01)
*H04B 1/525* (2015.01)
*H04L 5/14* (2006.01)
*H04W 84/04* (2009.01)
*H04W 92/20* (2009.01)

(52) U.S. Cl.
CPC .......... *H04W 16/10* (2013.01); *H04W 84/045* (2013.01); *H04W 92/20* (2013.01); *Y02B 60/50* (2013.01)

(56) References Cited

U.S. PATENT DOCUMENTS

| | | | |
|---|---|---|---|
| 2015/0078190 A1* | 3/2015 | Cheng | H04W 24/02 370/252 |
| 2016/0100415 A1* | 4/2016 | Mishra | H04L 5/14 370/277 |
| 2016/0105213 A1* | 4/2016 | Hua | H04B 1/525 370/278 |

* cited by examiner

DIGITAL FULL DUPLEX OVER SINGLE CHANNEL SOLUTION FOR SMALL CELL BACKHAUL APPLICATIONS

CROSS REFERENCE TO RELATED APPLICATIONS

This application claims the benefit of U.S. Provisional Patent Application No. 62/143,717, filed Apr. 6, 2015, which is incorporated by reference herein.

TECHNICAL FIELD

This application relates generally to small cell base stations, including backhaul applications for small cell base stations.

BACKGROUND

A conventional cellular network is deployed as a homogenous network of macrocell base stations. The macrocell base stations may all have similar antenna patterns and similar high-level transmit powers. To accommodate increases in data traffic, more macrocell base stations can be deployed in a homogenous network, but such a solution is often unattractive due to increased inter-cell interference on the downlink and due to the high costs associated with site acquisition for newly deployed macrocell base stations.

Because of these drawbacks and others, cellular network operators are turning to heterogeneous networks to meet the demands of increased data traffic. In heterogeneous networks, small cell base stations are used to provide small coverage areas that overlap with, or fill in gaps of, the comparatively larger coverage areas provided by macrocell base stations. The small coverage areas are typically provided in areas with high data traffic (or so called hotspots) to increase capacity. Examples of small cell base stations include, in order of decreasing coverage area, macrocell base stations, picocell base stations, and femtocell base stations or home base stations.

There has been a steady increase in the deployment of small cell base stations. In the near future, it is expected that in some areas there will be orders of magnitude more small cell base stations deployed than macro cells. With such high densities (e.g., tens of small cell base stations per square kilometer), the small cell backhaul network used to connect the small cell base stations to the core network, internet, and other services will be a challenge.

Installing high-capacity, low-latency wired connections from the small cell base stations to the core network would require an exorbitant capital expenditure on the part of network operators. A more economically feasible approach is to implement a wireless backhaul network to link the small cell base stations to the core network. For example, such a wireless backhaul network can link the small cell base stations to the core network via existing, macro base stations that already have wired access to the core network. However, the data traffic rate on the wireless backhaul can be very high given that a typical macro base station may be required to relay backhaul data for tens of small cell base stations. Thus, the design and implementation of high data rate wireless backhaul transmissions is important.

BRIEF DESCRIPTION OF THE DRAWINGS/FIGURES

The accompanying drawings, which are incorporated herein and form a part of the specification, illustrate the present disclosure and together with the description, further serve to explain the principles of the disclosure and to enable a person skilled in the pertinent art to make and use the disclosure.

The present disclosure will be described with reference to the accompanying drawings. The drawing in which an element first appears is typically indicated by the leftmost digit(s) in the corresponding reference number.

DETAILED DESCRIPTION

In the following description, numerous specific details are set forth in order to provide a thorough understanding of the disclosure. However, it will be apparent to those skilled in the art that the disclosure, including structures, systems, and methods, may be practiced without these specific details. The description and representation herein are the common means used by those experienced or skilled in the art to most effectively convey the substance of their work to others skilled in the art. In other instances, well-known methods, procedures, components, and circuitry have not been described in detail to avoid unnecessarily obscuring aspects of the disclosure.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described, For purposes of this discussion, the term "module" or "block" (e.g., a block in a block diagram) shall be understood to include software, firmware, or hardware (such as one or more circuits, microchips, processors, and/or devices), or any combination thereof. In addition, it will be understood that each module or block can include one, or more than one, component within an actual device, and each component that forms a part of the described module or block can function either cooperatively or independently of any other component forming a part of the module or block. Conversely, multiple modules or blocks described herein can represent a single component within an actual device.

Further, components within a module or block can be in a single device or distributed among multiple devices in a wired or wireless manner.

1. Overview

To provide for higher data rates, a wireless backhaul network for connecting small cell base stations to the core network can be implemented using full-duplex over single channel communications. A duplex communication system includes two transceivers that communicate with each other over a channel in both directions. There are two types of duplex communication systems: half-duplex communication systems and full-duplex communication systems. In half-duplex communication systems, the two transceivers communicate with each other over the channel in both directions but only in one direction at a time; that is only one of the two transceivers transmits at any given point in time, while the other receives. A full-duplex communication system, on the other hand, does not have such a limitation. Rather, in a full-duplex communication system, the two transceivers can communicate with each other over the channel simultaneously in both directions.

Wireless communication systems often emulate full-duplex communication. For example, in some wireless communication systems two transceivers communicate with each other simultaneously in both directions using two different carrier frequencies or channels. This scheme, where communication is carried out simultaneously in both directions using two different carrier frequencies, is referred to as frequency division duplexing (FDD). FDD is said to only emulate full-duplex communication because FDD uses two half-duplex channels rather than a single channel to accomplish simultaneous communication in both directions.

Although emulated full-duplex communication using FDD allows for simultaneous communication in both directions, it requires two channels. True full-duplex communication eliminates the need for one of these two channels, resulting in increased spectrum efficiency and the ability to provide higher data rates. The difficulty with true full-duplex communication, and the reason why it has not become common place in wireless and mobile communication standards to date, is the significant interference that the receiver of a full-duplex communication device will generally experience from the full-duplex communication device's own transmitter transmitting over the same channel that the receiver is to receive signals. This interference is referred to as self-interference because the interference experienced by the receiver originates from its own paired transmitter.

For example, in a wireless backhaul network for small cell base stations, backhaul signals can be transmitted at power levels at 10 dBm and backhaul signals can be received at power levels at or below −60 dBm. At these levels, the self-interference needs to be reduced by at least 10 dBm−(−60 dBm)=70 dBm, not accounting for the receiver noise floor, to allow for information to be recovered from the received signals. Not only is the amount of self interference that needs to be canceled a challenging task, but also providing such cancellation in a compact and power efficient manner also provides challenges.

Described below are embodiments of an apparatus and method that provide sufficient self-interference cancellation in a compact and power efficient manner for a small cell wireless backhaul network. It should be noted that embodiments of the apparatus and method can be further used to communicate over other networks besides backhaul networks and are not limited to implementations within small cell base stations but can be used within a wide variety of other communication devices.

2. Exemplary Operating Environment

Figure 1:
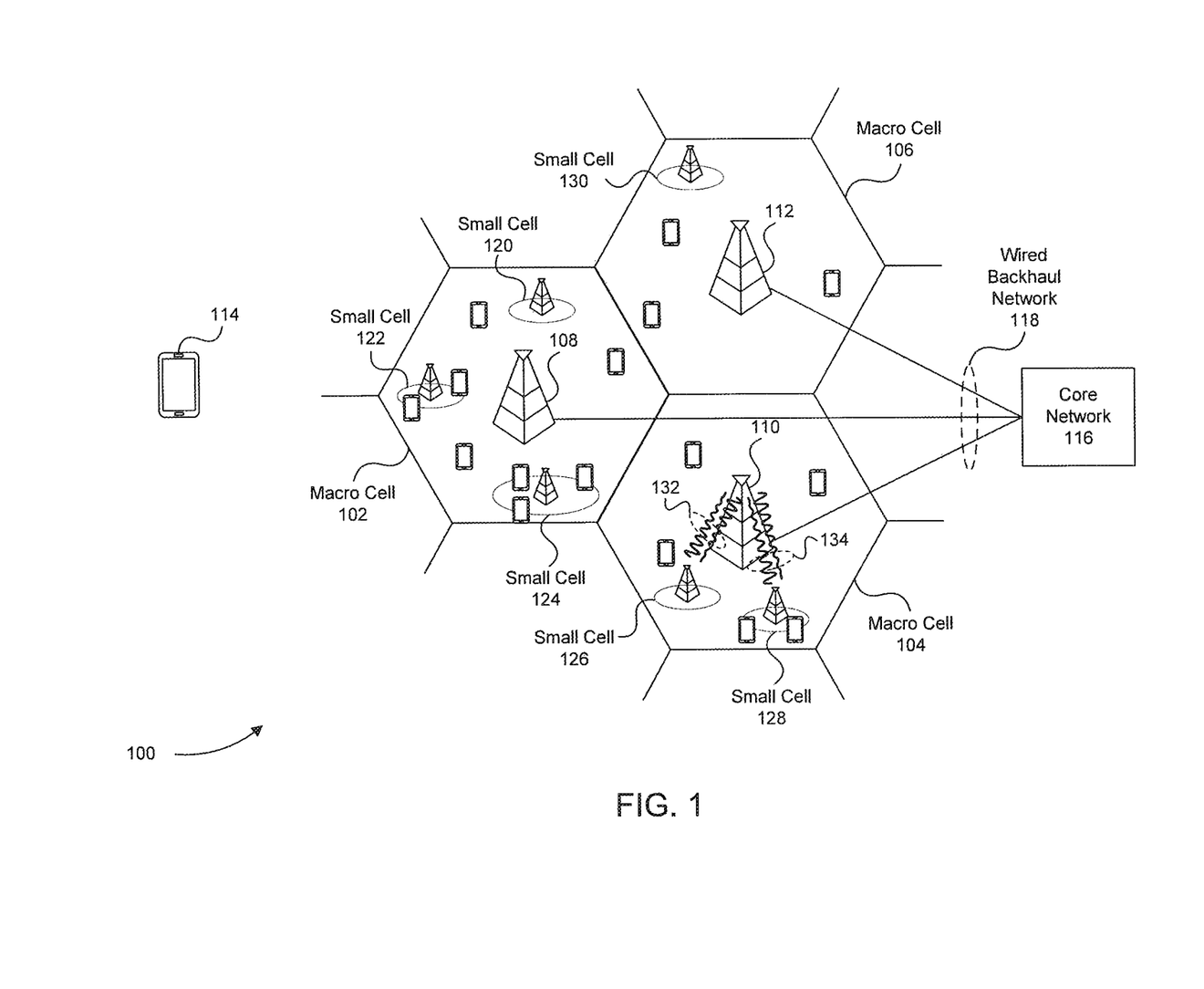
FIG. 1 illustrates an exemplary heterogeneous cellular network with small cell base station that provide small coverage areas that overlap with, or fill in gaps of, macrocell base stations in which embodiments of the present disclosure can be implemented.

FIG. 1 illustrates an exemplary heterogeneous cellular network 100 in which embodiments of the present disclosure can be implemented. Heterogeneous cellular network 100 can be operated in accordance with any one of a number of different cellular network standards, including one of the current or yet to be released versions of the long-term evolution (LTE) standard and the worldwide interoperability for microwave access (WiMAX) standard.

As shown in FIG. 1, heterogeneous cellular network 100 is distributed over macrocells 102-106 that are each served by a respective macrocell base station 108-112. Macrocells 102-106 are geographically joined together to enable user terminals (UTs) 114 (e.g., mobile phones, laptops, tablets, pagers, smart watches, smart glasses, or any other device with an appropriate wireless modem) to wirelessly communicate over a wide area with a core network 116 via macrocell base stations 108-112. Macrocell base stations 108-112 are coupled to the core network by a wired backhaul network 118.

As further shown in FIG. 1, macrocells 102-106 are overlaid with several small cells 120-130 that are each served by a respective small cell base station shown at the center of each small cell. The small cell base stations can be deployed in areas with high data traffic to increase capacity or in areas with limited or no coverage provided by macrocell base stations 108-112. Although not shown for each small cell base station, the small cell base stations are further coupled to core network 116 via a wireless back haul network.

For example, the small cell base stations of small cells 126 and 128 are shown communicating over the wireless backhaul network via single-channel full-duplex communication signals 132 and 134, respectively. Single-channel full-duplex communication signals 132 and 134 are specifically sent to and received from macrocell base station 110, which uses wired backhaul network 118 to relay the backhaul data of small cells 126 and 128 to and from core network 116. In other embodiments, single-channel full-duplex communication signals 132 and 134 are directly sent to and received from core network 116 by the small cell base stations of small cells 126 and 128, respectively. In other embodiments, wired backhaul network 118 can be replaced with a wireless backhaul network or replaced in part by a wireless backhaul network.

Figure 2:
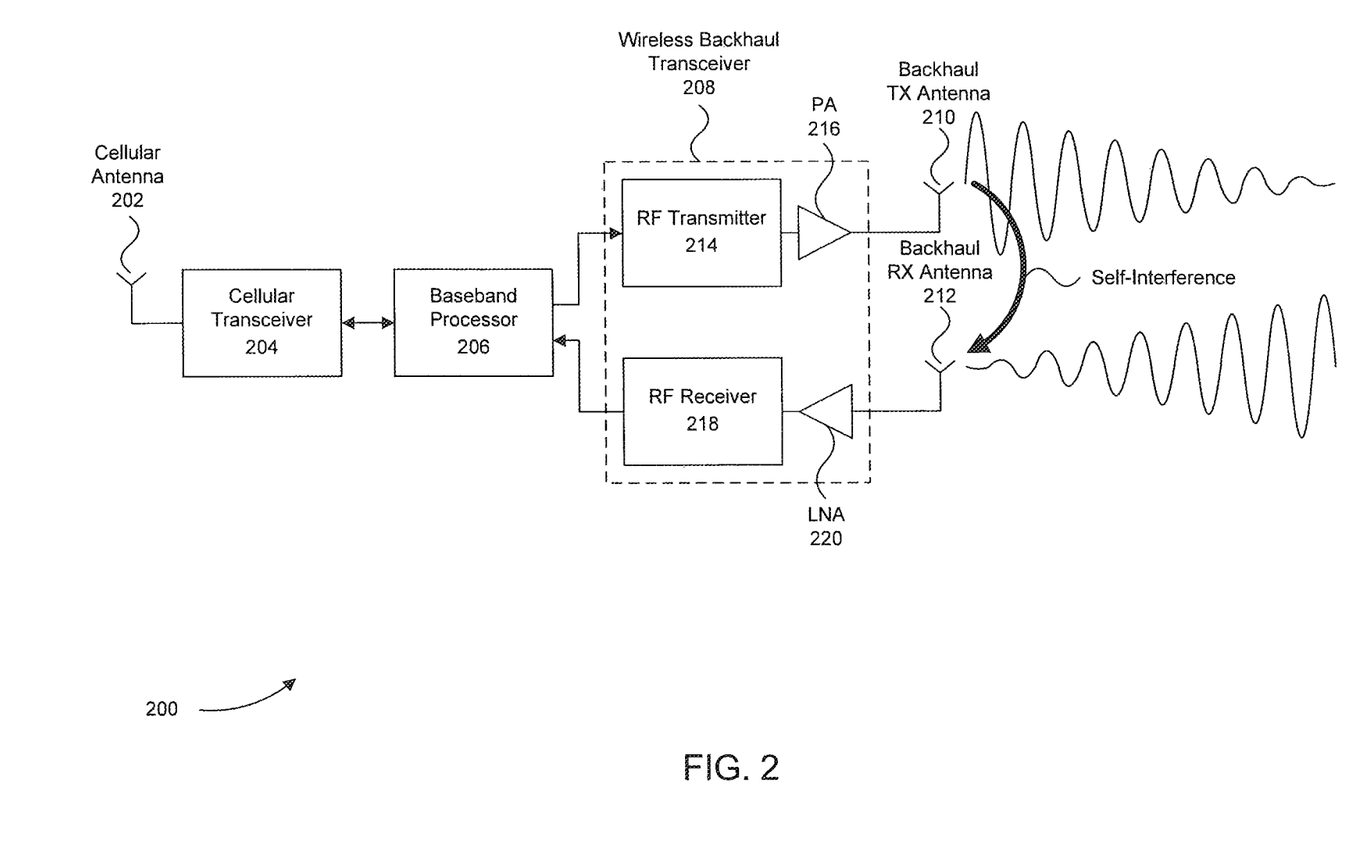
FIG. 2 illustrates an exemplary high-level block diagram of an implementation of a small cell base station in accordance with embodiments of the present disclosure.

Referring now to FIG. 2, an exemplary high-level block diagram 200 of an implementation of one or more of the small cell base stations in FIG. 1 is illustrated in accordance with embodiments of the present disclosure. As shown in block, diagram 200, the small cell base station includes at least one cellular antenna 202, a cellular transceiver 204, a baseband processor 206, a wireless backhaul transceiver 208, a backhaul transmit (TX) antenna 210, and a backhaul receive (RX) antenna 212. Wireless backhaul transceiver 208 includes an RF transmitter 214 coupled to a power amplifier (PA) 216 and an RF receiver 218 coupled to a low-noise amplifier (LNA) 220. It should be noted that FIG. 2 is provided by way of example and not limitation. One of ordinary skill in the art will recognize that other implementations of the small cell base station are possible without departing from the scope and spirit of the present disclosure.

In operation, baseband processor 206 can be used to implement, at least in part, the radio protocol stack for one of several different cellular standards, including LTE and WiMAX, and can be used as an interface for passing data between wireless backhaul transceiver 208 and cellular transceiver 204.

For example, data received via cellular antenna 202 from a UT served by the small cell base station can be passed to baseband processor 206. Baseband processor 206 can extract data from the uplink transmission received from the UT in accordance with a cellular radio protocol stack and map the data to a series of complex symbols to form a transmit baseband signal. Baseband processor 206 can then pass the transmit baseband signal to RF transmitter 214 and power amplifier 216. RF transmitter 214 can perform, among other things, up-conversion of the transmit baseband signal to a radio frequency (RF) carrier frequency, and power amplifier 216 can subsequently amplify the up-converted transmit baseband signal or transmit RF signal for wireless transmission, via backhaul TX antenna 210, over the wireless backhaul network. As discussed above, in regard to FIG. 1, the small cell base station can transmit the transmit RF signal to a macrocell base station or directly to the core network.

Similarly, a receive RF signal received via backhaul RX antenna 212 over the wireless backhaul network is first amplified by LNA 220 and then passed to RF receiver 218. RF receiver 218 can perform, among other things, down-conversion of the amplified receive RF signal to provide a series of complex symbols that form a receive baseband signal Baseband processor 206 can extract data from the symbols of the receive RF signal and provide the data to cellular transceiver 204 for transmission to the UT via cellular antenna 202.

The transmit RF signal and the receive RF signal, respectively transmitted and received over the wireless backhaul network by wireless backhaul transceiver 208, can be communicated over the wireless backhaul network over the same time and frequency band. In other words, the two signals can be communicated over the wireless backhaul network in accordance with a single-channel full-duplex communication scheme. The frequency band can be a millimeter radio band between 30 GHz and 300 GHz, such as 60 GHz.

However, as noted above, the receive chain of wireless backhaul transceiver 208 (i.e., RF receiver 218 and LNA 220) will experience significant interference from the transmitter chain of wireless backhaul transceiver 208 (i.e., RF transmitter 214 and PA 216), referred to as self-interference as shown in FIG. 2. For example, in the wireless backhaul network, transmit RF signals can be transmitted at or above 10 dBm and receive RF signals can be received at power levels at or below −60 dBm. At these levels, the self-interference needs to be reduced by at least 10 dBm−(−60 dBm)=70 dBm, not accounting for the receiver chain noise floor, to allow for information to be recovered from the receive RF signals. Described below is an apparatus and method that provides sufficient self-interference cancellation in a compact and power efficient manner for the small cell base station in FIG. 2.

3. Self-Interference Cancellation at Baseband

Figure 3:
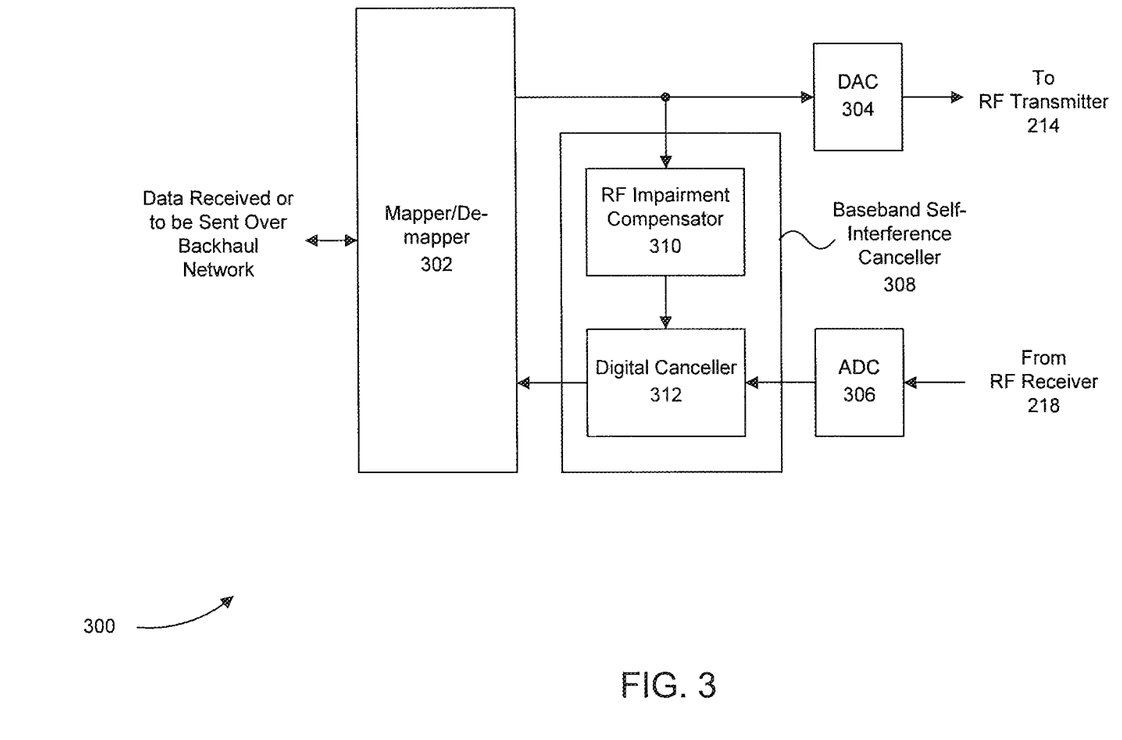
FIG. 3 illustrates an exemplary high-level block diagram of components in a baseband processor of a small cell base station in accordance with embodiments of the present disclosure.

Referring now to FIG. 3, an exemplary high-level block diagram 300 of components in a portion of baseband processor 206 of the small cell base station of FIG. 2 is illustrated in accordance with embodiments of the present disclosure. As shown in block diagram 300, baseband processor 206 includes a mapper/de-mapper 302, a digital-to-analog converter (DAC) 304, an analog-to-digital converter (ADC) 306, and a baseband self-interference canceller 308. It should be noted that FIG. 3 is provided by way of example and not limitation. One of ordinary skill in the art will recognize that other implementations of baseband processor 206 are possible without departing from the scope and spirit of the present disclosure.

In operation, mapper/de-mapper 302 is configured to map data to be transmitted over the wireless backhaul network to a series of complex symbols to provide a transmit baseband signal to RF transmitter 214. Before being provided to RF transmitter 214, the transmit baseband signal can be converted from a digital signal to an analog signal via DAC 304. In the opposite direction, a receive baseband signal from RF receiver 218 can be first converted from an analog signal to a digital signal by ADC 306 and then provided to mapper/demapper 302 to de-map complex symbols in the receive baseband signal.

However, prior to mapper/demapper 302 receiving the digital complex symbols that make up the receive baseband signal, baseband self-interference canceller 308 can be used to cancel self-interference from the transmit RF signal in the receive RF signal as explained above in regard to FIG. 2. More specifically, baseband self-interference canceller 308 includes an RF impairment compensator 310 and a digital canceller 312. RF impairment compensator 310 can distort the transmit baseband signal based on the analog components in the transmitter chain of wireless backhaul transceiver 208 (i.e., RF transmitter 214 and PA 216).

In general, these analog components in the transmitter chain distort the transmit baseband signal in both linear and non-linear ways, while also adding noise. RF impairment compensator 310 includes hardware to at least adaptively estimate the linear and non-linear distortions that the transmitter chain of wireless backhaul transceiver 208 introduces into the transmit baseband signal and uses this estimate to similarly distort a copy of the transmit baseband signal. RF impairment compensator 310 can further scale and delay the distorted transmit baseband signal to match the self-interference in the receive baseband signal. The distorted copy of the transmit baseband signal is then provided to digital canceller 312, which effectively subtracts the distorted copy of the transmit baseband signal from the receive baseband signal provided by ADC 306. Thus, baseband self-interference canceller cancels self-interference from the transmit RF signal in the receive RF signal at baseband.

In one embodiment, RI impairment compensator 310 can adaptively estimate the linear and non-linear distortions that the transmitter chain of wireless backhaul transceiver 208 by sending a range of input power levels through the transmitter chain and measuring the corresponding range of output power levels from the transmitter chain. The input power level may measure a RF signal, which may be generated from a baseband signal. The baseband signal may be a complex signal that comprises an in-phase component and a quadrature-phase component. In addition, RF impairment compensator 310 can adaptively estimate the linear and non-linear distortions that the transmitter chain of wireless backhaul transceiver 208 by measuring a relative change in the phase relationship between the corresponding baseband component signals I and Q after having been processed by the transmitter chain.

No self-interference cancellation need be performed in the analog domain at RF. For example, no-self interference need be performed prior to LNA 220 in FIG. 2. Saturation of LNA 220 is prevented by using separate antennas to transmit and receive over the wireless backhaul network. More specifically, as discussed above in regard to FIG. 2, backhaul TX antenna 210 is used to transmit over the wireless backhaul network and backhaul RX antenna 212 is used to receive over the wireless backhaul network. Separation between the antennas provides some level of isolation, which can reduce self-interference by a sufficient amount to prevent LNA 220 from becoming saturated due to self-interference. In addition, backhaul TX antenna 210 and backhaul RX antenna 212 can be implemented as directional antennas (as opposed to omni-directional antennas) to further limit self-interference. Because no self-interference cancellation is done in the analog domain at RF, self-interference cancellation is performed in a compact and power efficient manner.

Figure 4:
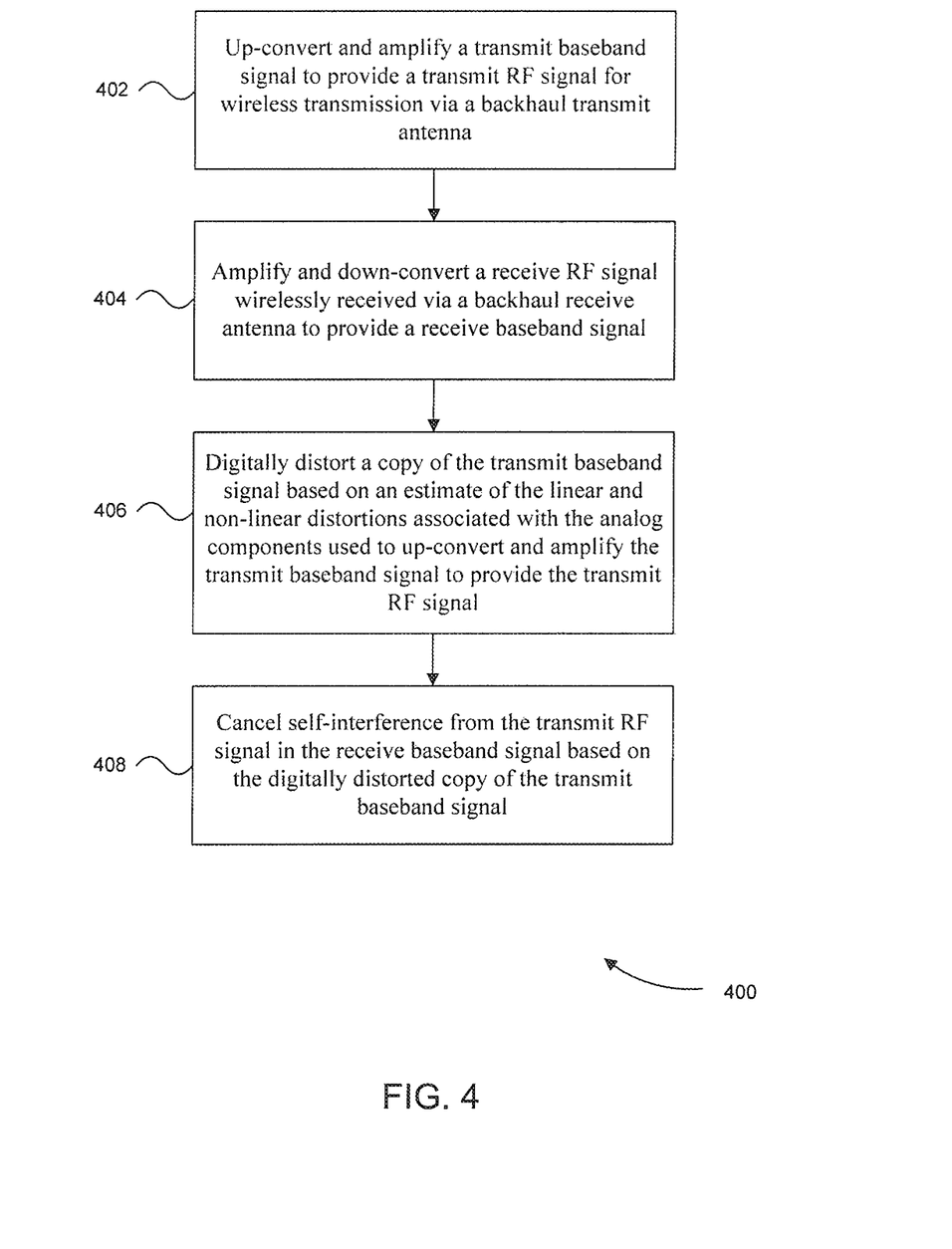
FIG. 4 illustrates a flowchart of a method for a small cell base station to perform self-interference cancellation at baseband in accordance with embodiments of the present disclosure.

Referring now to FIG. 4, a flowchart 400 of a method for a small cell base station to perform self-interference cancellation at baseband is illustrated in accordance with embodiments of the present disclosure. The method of flowchart 400 can be implemented by a small cell base station configured as shown in FIGS. 2 and 3. However, it should be noted that the method can be implemented by other small cell base stations with different configurations.

The method of flowchart 400 begins at step 402. At step 402, the small cell base station up-converts and amplifies a transmit baseband signal to provide a transmit RF signal for wireless transmission via a backhaul transmit antenna. The up-conversion and amplification are performed using analog components that add both linear and non-linear distortions to the transmit baseband signal as well as noise.

At step 404, the small cell base station amplifies and down-converts a receive RF signal wirelessly received via a backhaul receive antenna to provide a receive baseband signal. The receive RF signal is wirelessly received over the same time and frequency band that the transmit RF signal is transmitted in accordance with a single-channel full-duplex wireless backhaul communication scheme. As a result, the receive RF signal includes self-interference from the transmit RF signal.

At step 406, the small cell base station digitally distorts a copy of the transmit baseband signal based on an estimate of the linear and non-linear distortions associated with the analog components used to up-convert and amplify the transmit baseband signal to provide the transmit RF signal. The distorted copy of the transmit baseband signal can be further scaled and delayed at step 406 to better match the self-interference in the receive baseband signal.

At step 408, the small cell base station cancels self-interference in the receive baseband signal based on the digitally distorted copy of the transmit baseband signal. The cancelation can be performed in the digital domain.

4. Example Computer System Environment

It will be apparent to persons skilled in the relevant art(s) that various elements and features of the present disclosure, as described herein, can be implemented in hardware using analog and/or digital circuits, in software, through the execution of instructions by one or more general purpose or special-purpose processors, or as a combination of hardware and software.

Figure 5:
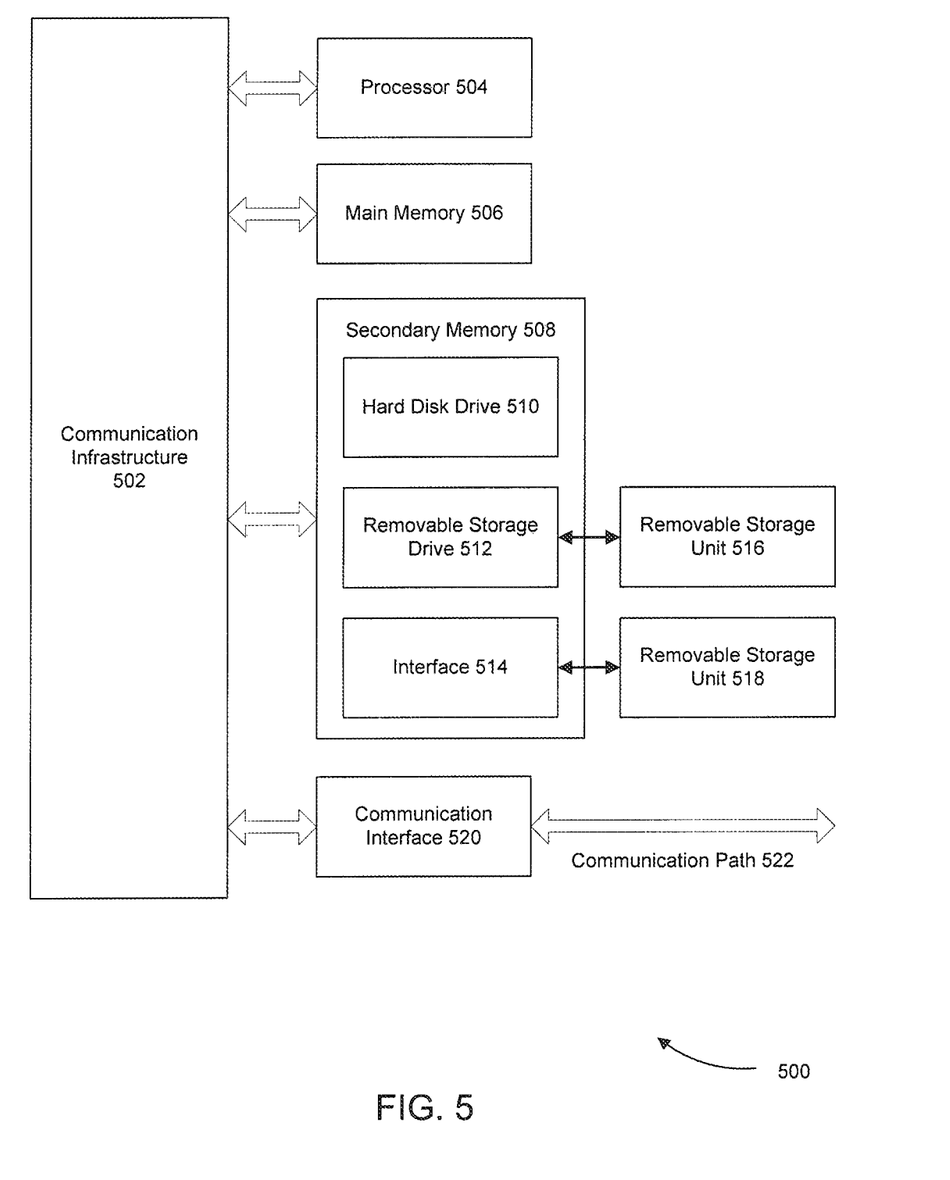
FIG. 5 illustrates a block diagram of an example computer system that can be used to implement aspects of the present disclosure.

The following description of a general purpose computer system is provided for the sake of completeness. Embodiments of the present disclosure can be implemented in hardware, or as a combination of software and hardware. Consequently, embodiments of the disclosure may be implemented in the environment of a computer system or other processing system. An example of such a computer system 500 is shown in FIG. 5. Blocks depicted in FIGS. 2 and 3 may execute on one or more computer systems 500. Furthermore, each of the steps of the method depicted in FIG. 4 can be implemented on one or more computer systems 500.

Computer system 500 includes one or more processors, such as processor 504. Processor 504 can be a special purpose or a general purpose digital signal processor. Processor 504 is connected to a communication infrastructure 502 (for example, a bus or network). Various software implementations are described in terms of this exemplary computer system. After reading this description, it will become apparent to a person skilled in the relevant art(s) how to implement the disclosure using other computer systems and/or computer architectures.

Computer system 500 also includes a main memory 506, preferably random access memory (RAM), and may also include a secondary memory 508. Secondary memory 508 may include, for example, a hard disk drive 510 and/or a removable storage drive 512, representing a floppy disk drive, a magnetic tape drive, an optical disk drive, or the like. Removable storage drive 512 reads from and/or writes to a removable storage unit 816 in a well-known manner. Removable storage unit 516 represents a floppy disk, magnetic tape, optical disk, or the like, which is read by and written to by removable storage drive 512. As will be appreciated by persons skilled in the relevant art(s), removable storage unit 516 includes a computer usable storage medium having stored therein computer software and/or data.

In alternative implementations, secondary memory 508 may include other similar means for allowing computer programs or other instructions to be loaded into computer system 500. Such means may include, for example, a removable storage unit 518 and an interface 514. Examples of such means may include a program cartridge and cartridge interface (such as that found in video game devices), a removable memory chip (such as an EPROM, or PROM) and associated socket, a thumb drive and USB port, and other removable storage units 518 and interfaces 514 which allow software and data to be transferred from removable storage unit 518 to computer system 500.

Computer system 500 may also include a communications interface 520. Communications interface 520 allows software and data to be transferred between computer system 500 and external devices. Examples of communications interface 520 may include a modem, a network interface (such as an Ethernet card), a communications port, a PCM-CIA slot and card, etc. Software and data transferred via communications interface 520 are in the form of signals which may be electronic, electromagnetic, optical, or other signals capable of being received by communications interface 520. These signals are provided to communications interface 520 via a communications path 522. Communications path 522 carries signals and may be implemented using wire or cable, fiber optics, a phone line, a cellular phone link, an RF link and other communications channels.

As used herein, the terms "computer program medium" and "computer readable medium" are used to generally refer to tangible storage media such as removable storage units 516 and 518 or a hard disk installed in hard disk drive 510. These computer program products are means for providing software to computer system 500.

Computer programs (also called computer control logic) are stored in main memory 506 and/or secondary memory 508. Computer programs may also be received via communications interface 520. Such computer programs, when executed, enable the computer system 500 to implement the present disclosure as discussed herein. In particular, the computer programs, when executed, enable processor 504 to implement the processes of the present disclosure, such as any of the methods described herein. Accordingly, such computer programs represent controllers of the computer system 500. Where the disclosure is implemented using software, the software may be stored in a computer program product and loaded into computer system 500 using removable storage drive 512, interface 514. or communications interface 520.

In another embodiment, features of the disclosure are implemented primarily in hardware using, for example, hardware components such as application-specific integrated circuits (ASICs) and gate arrays. Implementation of a hardware state machine so as to perform the functions described herein will also be apparent to persons skilled in the relevant art(s).

5. Conclusion

Embodiments have been described above with the aid of functional building blocks illustrating the implementation of specified functions and relationships thereof The boundaries of these functional building blocks have been arbitrarily defined herein for the convenience of the description Alternate boundaries can be defined so long as the specified functions and relationships thereof are appropriately performed.

The foregoing description of the specific embodiments will so fully reveal the general nature of the disclosure that others can, by applying knowledge within the skill of the art, readily modify and/or adapt for various applications such specific embodiments, without undue experimentation, without departing from the general concept of the present disclosure. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

What is claimed is:

1. A small cell base station, comprising:
 a backhaul transceiver configured to up-convert and amplify a transmit baseband signal to provide a transmit RF signal and amplify and down-convert a receive RF signal to provide a receive baseband signal, wherein the transmit RF signal is wirelessly transmitted via a backhaul transmit antenna over a same time and frequency hand as the receive RF signal is wirelessly received via a backhaul receive antenna;
 a baseband canceller configured to cancel self-interference from the transmit RF signal in the receive RF signal at baseband based on a distorted copy of the transmit baseband signal.

2. The small cell base station of claim 1, wherein the baseband canceller is further configured to generate the distorted copy of the transmit baseband signal based on non-linear distortions associated with the up-conversion and amplification performed by the backhaul transceiver on the transmit baseband signal.

3. The small cell base station of claim 1, wherein the baseband canceller is further configured to cancel the self-interference from the transmit RF signal in the receive RF signal at baseband in the digital domain.

4. The small cell base station of claim 1, wherein the frequency band is 60 GHz.

5. The small cell base station of claim 1, wherein the frequency band is a millimeter radio band between 30 GHz and 300 GHz.

6. The small cell base station of claim 1, wherein the transmit RF signal is wirelessly transmitted to a macro base station, and the receive RF signal is wirelessly received from the macro base station.

7. The small cell base station of claim 6, wherein the macro cell base station has access to a core network via a wired connection.

8. The small cell base station of claim 1, wherein the backhaul transmit antenna and the backhaul receive antenna are directional antennas.

9. A small cell base station, comprising:
 a backhaul transceiver configured to up-convert and amplify a transmit baseband signal to provide a transmit RE signal and amplify and down-convert a receive RF signal to provide a receive baseband signal, wherein the transmit RF signal is wirelessly transmitted via a backhaul transmit antenna over a same time and frequency band as the receive RF signal is wirelessly received via a backhaul receive antenna, wherein the backhaul transmit antenna and the backhaul receive antenna are directional antennas,
 a baseband canceller configured to cancel self-interference from the transmit RE signal in the receive RF signal at baseband based on a distorted copy of the transmit baseband signal, wherein no cancellation of the self-interference from the transmit RF signal in the receive RF signal is performed at RF.

10. The small cell base station of claim 9, wherein the baseband canceller is further configured to generate the distorted copy of the transmit baseband signal based on non-linear distortions associated with the up-conversion and amplification performed by the backhaul transceiver on the transmit baseband signal.

11. The small cell base station of claim 9, wherein the baseband canceller is further configured to cancel the self-interference from the transmit RF signal in the receive RF signal at baseband in the digital domain.

12. The small cell base station of claim 9, wherein the frequency band is 60 GHz.

13. The small cell base station of claim 9, wherein the frequency band is a millimeter radio band between 30 GHz and 300 GHz.

14. The small cell base station of claim 9, wherein the transmit RF signal is wirelessly transmitted to a macro base station, and the receive RI signal is wirelessly received from the macro base station.

15. The small cell base station of claim 14, wherein the macro cell base station has access to core network via a wired connection.

16. The small cell base station of claim 9, wherein the backhaul transmit antenna and the backhaul receive antenna are directional antennas.

17. A method, comprising:
 processing a transmit baseband signal to provide a transmit RF signal;
 wirelessly transmitting the transmit RF signal via a backhaul transmit antenna over a same time and frequency band as a receive RF signal is wirelessly received via a backhaul receive antenna;
 processing the receive RF signal to provide a receive baseband signal; and cancelling self-interference from the transmit RF signal in the receive RF signal at baseband based on a distorted copy of the transmit baseband signal, wherein no cancellation of the self-interference from the transmit RF signal in the receive RF signal is performed at RF.

18. The method of claim 17, further comprising:
generating the distorted copy of the transmit baseband signal based on non-linear distortions associated with the processing the transmit baseband signal to provide the transmit RF signal.

19. The method of claim 18, wherein the processing the transmit baseband signal to provide the transmit RF signal comprises up-conversion and amplification of the transmit baseband signal.

20. The method of claim 18, wherein the cancelling self-interference from the transmit RF signal in the receive RF signal at baseband based on the distorted copy of the transmit baseband signal is performed in the digital domain.

\* \* \* \* \*